United States Patent
Jung et al.

(10) Patent No.: US 11,620,054 B1
(45) Date of Patent: Apr. 4, 2023

(54) PROACTIVE MONITORING AND MANAGEMENT OF STORAGE SYSTEM INPUT-OUTPUT OPERATION LIMITS

(71) Applicant: Dell Products L.P., Round Rock, TX (US)

(72) Inventors: Jaeyoo Jung, Shrewsbury, MA (US); Narasimha R. Challa, Hopkinton, MA (US); Sanjib Mallick, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/725,704

(22) Filed: Apr. 21, 2022

(51) Int. Cl.
*G06F 3/06* (2006.01)
*G06F 13/10* (2006.01)

(52) U.S. Cl.
CPC ............ *G06F 3/0613* (2013.01); *G06F 3/067* (2013.01); *G06F 3/0659* (2013.01); *G06F 13/102* (2013.01)

(58) Field of Classification Search
None
See application file for complete search history.

(56) References Cited

U.S. PATENT DOCUMENTS

| | | |
|---|---|---|
| 6,567,397 B1 | 5/2003 | Campana et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Scott C Sun
(74) *Attorney, Agent, or Firm* — Ryan, Mason & Lewis, LLP

(57) ABSTRACT

An apparatus comprises a processing device configured to identify a number of outstanding input-output (IO) operations corresponding to at least one target of a storage system, wherein the identifying is performed periodically at designated time intervals. The processing device is further configured to determine whether the number of outstanding IO operations is trending upward and exceeds a threshold over a plurality of the designated time intervals. At least one message indicating a queue full condition is generated responsive to an affirmative determination that the number of outstanding IO operations is trending upward and an affirmative determination that the number of outstanding IO operations exceeds the threshold. The at least one message is sent to one or more host devices associated with one or more initiators corresponding to the at least one target of the storage system.

20 Claims, 4 Drawing Sheets

(56) References Cited

U.S. PATENT DOCUMENTS

| | | |
|---|---|---|
| 7,890,664 B1 | 2/2011 | Tao et al. |
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1 | 2/2006 | Kadoiri et al. |
| 2006/0277383 A1 | 12/2006 | Hayden et al. |
| 2007/0174849 A1 | 7/2007 | Cheung et al. |
| 2008/0043973 A1 | 2/2008 | Lai et al. |
| 2008/0201458 A1 | 8/2008 | Salil |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0060257 A1* | 3/2018 | Nygren ............. G06F 13/1689 |
| 2018/0189635 A1 | 7/2018 | Olarig et al. |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMWARE, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

NVM Express, "NVM Express Base Specification, Revision 2.0a," NVM Express, Jul. 23, 2021, 454 pages.

C. Taylor, "What is iSCSI and How Does it Work?" https://www.enterprisestorageforum.com/hardware/what-is-iscsi-and-how-does-it-work/#:~:text=iSCSI%20is%20a%20transport%20layer,upon%20arrival%20at%20the%20target., May 23, 2019, 5 pages.

dell.com, "QFULL and Execution Throttle," https://www.dell.com/community/VNX/QFULL-and-Execution-Throttle-queue-depth/td-p/6910755, Accessed Apr. 20, 2022, 8 pages.

\* cited by examiner

PROACTIVE MONITORING AND MANAGEMENT OF STORAGE SYSTEM INPUT-OUTPUT OPERATION LIMITS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations for delivery to storage ports of the storage system. Different ones of the host devices can run different applications with varying workloads and associated IO patterns. Such host devices also generate additional IO operations in performing various data services such as replication and migration.

The storage ports are typically limited in number and each has limited resources for handling IO operations received from the host devices. As a result, a storage array may support a predetermined number of IO operations per storage port at a given time. If a number of IO operations exceeds storage port and/or storage array limits, remedial measures must be taken to ensure completion of the IO operations.

SUMMARY

Illustrative embodiments disclosed herein provide techniques for proactively monitoring and managing storage port IO operation limits before degradation of service such as, for example, decreased IO operations per second (IOPS) and increased latency, can occur.

For example, some embodiments advantageously configure storage arrays to dynamically control storage port IO operation thresholds and to utilize exponential moving average (EMA) computations to determine upward or downward trends for the number of outstanding IO operations per port. With these approaches, storage arrays proactively address situations where the number of IO operations may exceed system limits, such that overall storage system performance is improved relative to conventional approaches, which are reactive in nature.

In one embodiment, an apparatus comprises at least one processing device that includes a processor and a memory, with the processor being coupled to the memory. The at least one processing device is configured to identify a number of outstanding IO operations corresponding to at least one target of a storage system, wherein the identifying is performed periodically at designated time intervals. The at least one processing device is further configured to determine whether the number of outstanding IO operations is trending upward and exceeds a threshold over a plurality of the designated time intervals. At least one message indicating a queue full condition is generated responsive to an affirmative determination that the number of outstanding IO operations is trending upward and an affirmative determination that the number of outstanding IO operations exceeds the threshold. The at least one message is sent to one or more host devices associated with one or more initiators corresponding to the at least one target of the storage system.

The at least one processing device illustratively comprises at least a portion of the storage system itself, such as one or more storage controllers or a storage array or other type of storage system.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
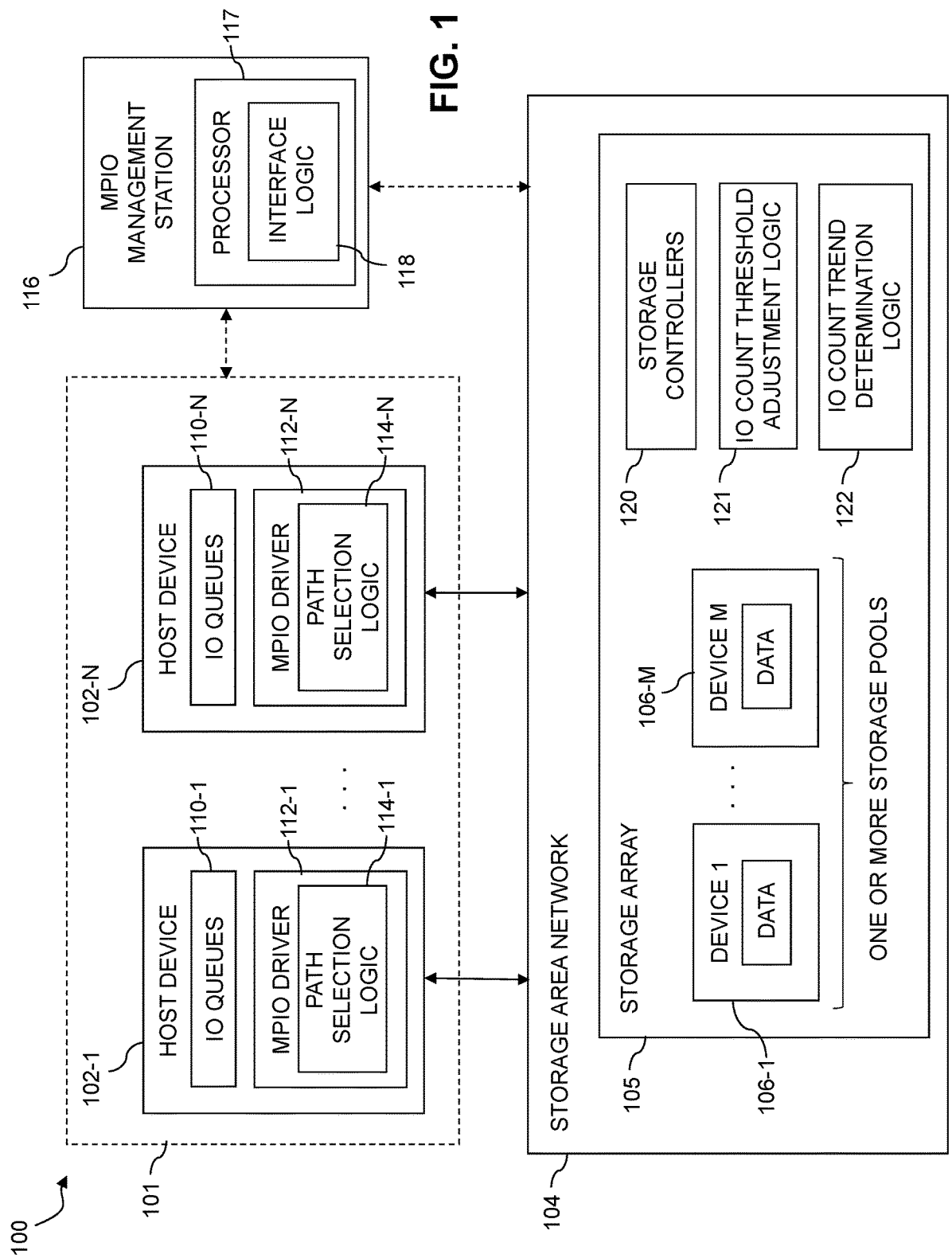
FIG. 1 is a block diagram of an information processing system configured with functionality for IO count threshold adjustment and trend determination in a storage system in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments adjust IO operation count thresholds and identify IO operation trends to proactively address scenarios where the storage array 105 may be reaching maximum IO operation limits for IO operations sent to the storage array 105 from one or more of the host devices 102.

The host devices 102 illustratively comprise respective computers, servers or other types of processing devices capable of communicating with the storage array 105 over the SAN 104. For example, at least a subset of the host devices 102 may be implemented as respective processing devices of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. As explained in more detail herein, the multi-path layer, and more particularly, the respective instances of the path selection logic 114-1, . . . 114-N, further includes functionality for path selection based on whether queue full (referred to herein as "QFULL") conditions are received from the storage array 105.

The MPIO drivers 112 may comprise, for example, otherwise conventional MPIO drivers, such as PowerPath® drivers from Dell Technologies, suitably modified in the manner disclosed herein to provide functionality for path selection based on whether QFULL conditions are received from the storage array 105. Other types of MPIO drivers from other driver vendors may be suitably modified to incorporate functionality for path selection based on whether QFULL conditions are received from the storage array 105 as disclosed herein.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, can be configured to perform at least a portion of the functionality for path selection based on QFULL conditions as disclosed herein. For example, the MPIO management station 116 can provide to the path selection logic 114 of the respective MPIO drivers 112 information regarding the availability and QFULL statuses of respective paths to the storage array 105.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

It is also to be appreciated that a wide variety of other types of rate negotiation may be performed in other embodiments.

Various host-side scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105. Examples of such HBAs and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique (VU) command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. Such host registration operations are illustratively part of a "host registration process" as that term is broadly used herein.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. For example, messages from the storage array regarding QFULL conditions associated with particular storage ports, which may affect path selection, can be sent to the MPIO driver 112-1 via the MPIO management station 116. Host multi-pathing software can be used to implement a multi-path layer comprising MPIO drivers 112 of respective host devices 102 as well as related management appliance software such as the above-noted PPMA of MPIO management station 116.

As noted previously, storage ports are typically limited in number and each has limited resources for handling IO operations received from the host devices. As a result, a storage array may support a predetermined number of IO operations per storage port at a given time. If a number of IO operations exceeds storage port and/or storage array limits, remedial measures must be taken to ensure completion of the IO operations.

With conventional approaches, a QFULL message is sent from a storage system to one or more host devices responsive to the number of IO operations reaching system or storage port limits. In an operational example, a storage array may support 1024 iSCSI sessions per IP port, and each connection and session may infinitely fill up iSCSI IO queue depth. Assuming that the storage array can only sustain 4096 outstanding IO operations at a time, the array may queue up iSCSI IO capsules all the way up to the system limit of 4096, and subsequent IO operations will exceed the IO operation limits of the storage array, resulting in QFULL messages being sent to the host devices.

Current approaches are reactive in nature, such that host devices are notified after IO operations exceed storage system or storage port limits and operations such as, for example, IOPS, have already been degraded. Additionally, with conventional techniques import administrative commands (e.g., inquiry (INQ), read capacity (READ CAP), test unit ready (TUR), atomic test and set (ATS), etc.) may be rejected responsive to the number of IO operations reaching a system limit, causing a host device OS to reinstate paths, which may be disruptive for mission critical applications. Also, with conventional approaches, QFULL messages may be sent to a random host device in a cluster when a system is already experiencing a shortage of resources. With current techniques, technical problems also exist in that host device applications may encounter random latency depending on when IO operation limits are reached, and storage array service processors may become unattachable and run out of store and forward (S&F) memory.

Illustrative embodiments provide techniques to monitor the system ingress and egress ratio of each storage port to determine an equilibrium point. Once a proactive QFULL condition is met, the embodiments are configured to broadcast a QFULL message to each iSCSI session attached to the same storage port. With this approach, storage arrays can maximize IOPS and maintain latency under system limits. The embodiments advantageously work with imbalanced central processing unit (CPU) core configurations and with multiple service processors.

In the FIG. 1 embodiment, the storage array 105 comprises a plurality of storage controllers 120, IO count threshold adjustment logic 121, and IO count trend determination logic 122. In other embodiments, at least portions of one or more of the IO count threshold adjustment logic 121 and the IO count trend determination logic 122 can be implemented at least in part external to the storage array 105 rather than internal to the storage array 105. For example, in some embodiments at least portions of the IO count threshold adjustment logic 121 and the IO count trend determination logic 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing IO operations. For example, in some embodiments, each of the storage controllers 120 has a different local cache or a different allocated portion of a global cache associated therewith, although numerous alternative arrangements are possible. The storage controllers 120 can be implemented as respective storage processors, directors or other storage system components configured to control storage system operations relating to processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 2.0a, July 2021, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and IO operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105.

As another illustration, in some embodiments, the IO operation priority queues are implemented as respective SLO-based queues. For example, the SLO-based queues illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues. The SLO-based queues are illustratively associated with respective SLOs for processing of IO operations in the storage array 105.

In these and other embodiments, process tags may be used in assigning different ones of the IO operations to different ones of the SLO-based queues or other IO operation priority queues of the storage array 105, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the IO operation priority queues.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a distributed storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, ALUA/ANA arrangements and/or DALUA/DANA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated above, illustrative embodiments overcome various drawbacks of conventional practice by configuring the system 100 to include functionality for IO count threshold adjustment and trend determination in a storage array 105, as will now be described in more detail.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105. The path selection logic 114-1 is illustratively configured to control delivery of the IO operations from the host device 102-1 to the storage array 105. The other host devices 102 are assumed to operate in a similar manner via their respective instances of MPIO drivers 112 and corresponding path selection logic 114.

An example of an algorithm performed by the storage array 105 and one or more of the host devices 102 in implementing IO count threshold adjustment and trend determination will now be described. In the following description, a host device may be referred to as simply a "host." Similarly, a storage array may be referred to as simply an "array."

The storage array 105 in some embodiments, through the IO count trend determination logic 122 is illustratively configured to identify a number of outstanding IO operations corresponding to at least one target (e.g., port) of the storage array 105, and to determine whether the number of outstanding IO operations is trending upward and whether the number of outstanding IO operations exceeds a threshold over a plurality of designated time intervals. In more detail, the IO count trend determination logic 122 sets as the threshold a pre-configured parameter (e.g., user configured, system configured or otherwise specified or designated) for a maximum number of outstanding IO operations per port. In a non-limiting example, the threshold may be 800 outstanding IO operations per port. In an illustrative embodiment, the IO count trend determination logic 122 periodically monitors the number of outstanding IO operations per port at designated time intervals (e.g., every 5 ms) and computes a plurality of EMAs of the number of outstanding IO operations, wherein respective EMAs correspond to different-sized windows of time. For example, the storage array 105, and more particularly, the IO count trend determination logic 122, computes EMAs for windows of 70 ms (14 5 ms periods), 250 ms (50 5 ms periods) and 1000 ms (200 5 ms periods) in order to respectively detect short, middle and long term trends of outstanding IO operation counts per port. The windows slide every 5 ms.

In determining whether the number of outstanding IO operations is trending upward over a plurality of the designated time intervals, the IO count trend determination logic 122 compares the respective EMAs to determine whether one or more of the EMAs is greater than or less than one or more other ones of the EMAs. For example, if the short and middle term EMAs (e.g., EMAs for the 70 ms and 250 ms windows) are both greater than the long term EMA (e.g., EMA for the 1000 ms window) for a given plurality of designated time intervals, and the short term EMA is maintained above the middle and long term EMAs for the given plurality of designated time intervals, the IO count trend determination logic 122 determines that there is an upward trend in the number of outstanding IO operations. In another example, if the short and middle term EMAs (e.g., EMAs for the 70 ms and 250 ms windows) are both less than the long term EMA (e.g., EMA for the 1000 ms window) for a given plurality of designated time intervals, and the short term EMA is maintained below the middle and long term EMAs for the given plurality of designated time intervals, the IO count trend determination logic 122 determines that there is a downward trend in the number of outstanding IO operations.

When the IO count trend determination logic 122 determines that there is an upward trend in the number of outstanding IO operations and the short term EMA exceeds the threshold for the maximum number of outstanding IO operations per port for a given plurality of designated time intervals, the storage array 105 generates at least one message indicating a QFULL condition. The message is sent to one or more host devices 102 associated with one or more initiators corresponding to a given target (e.g., port) of the storage array 105 that is experiencing the upward trend and exceeding of the threshold for maximum number of outstanding IO operations. The message is sent to every one of the host devices 102 associated with an initiator corresponding to the given target.

Alternatively, if the IO count trend determination logic 122 determines that there is a downward trend in the number of outstanding IO operations and/or determines that the short term EMA is less than the threshold for the maximum number of outstanding IO operations per port for a given port at a plurality of designated time intervals, the IO count trend determination logic 122 concludes that a QFULL condition has not been met at that time, and does not generate or send a message indicating a QFULL condition for the given port at that time. For example, when the IO count trend determination logic 122 determines that there is a downward trend in the number of outstanding IO operations and the short term EMA exceeds the threshold for the maximum number of outstanding IO operations per port for a given plurality of designated time intervals, the IO count trend determination logic 122 concludes that a QFULL condition has not been met at that time, and does not generate or send a message indicating a QFULL condition for the given port at that time.

In another example, when the IO count trend determination logic 122 determines that there is an upward trend in the number of outstanding IO operations and the short term EMA is less than the threshold for the maximum number of outstanding IO operations per port for a given plurality of designated time intervals, the IO count trend determination logic 122 concludes that a QFULL condition has not been met at that time, and does not generate or send a message indicating a QFULL condition for the given port at that time.

In yet another example, when the IO count trend determination logic 122 determines that there is a downward trend in the number of outstanding IO operations and the short term EMA is less than the threshold for the maximum number of outstanding IO operations per port for a given plurality of designated time intervals, the IO count trend determination logic 122 concludes that a QFULL condition has not been met at that time, and does not generate or send a message indicating a QFULL condition for the given port at that time.

It is to be understood that the embodiments are not necessarily limited to using EMA to determine upward or downward trends in the number of outstanding IO operations, and that other techniques may be employed to determine the upward or downward trends. In addition, the windows used for detecting short, middle and long term trends of outstanding IO operation counts per port are not necessarily limited to the 70 ms, 250 ms and 1000 ms windows, and other windows of different sizes may be used.

As used herein the term "average" is to be broadly construed to refer to, for example, mean, mode, median or other technique to find average.

As used herein the term "trend" is to be broadly construed to refer to, for example, an identified movement (e.g., increase or decrease) in the number of outstanding IO operations over a period of time.

As used herein the terms "time intervals," "designated time intervals" or "specified time intervals" are to be broadly construed to refer to, for example, fixed (e.g., periodic) or variable time intervals (e.g., dynamically varying time periods).

As used herein the term "threshold" is to be broadly construed to refer to, for example, fixed or variable thresholds (e.g., dynamically varying thresholds).

In some embodiments, after a message indicating a QFULL condition is sent, the storage array 105 waits for a predetermined period of time to elapse (e.g., 50 ms), and then again performs operations to determine whether the number of outstanding IO operations is trending upward and whether the number of outstanding IO operations exceeds the threshold for the maximum number of outstanding IO operations per port for a given plurality of designated time intervals. If the IO count trend determination logic 122 again determines that the conditions for generation of a message indicating a QFULL condition have been met, the storage array 105 again generates and sends the message indicating the QFULL condition.

Figure 4:
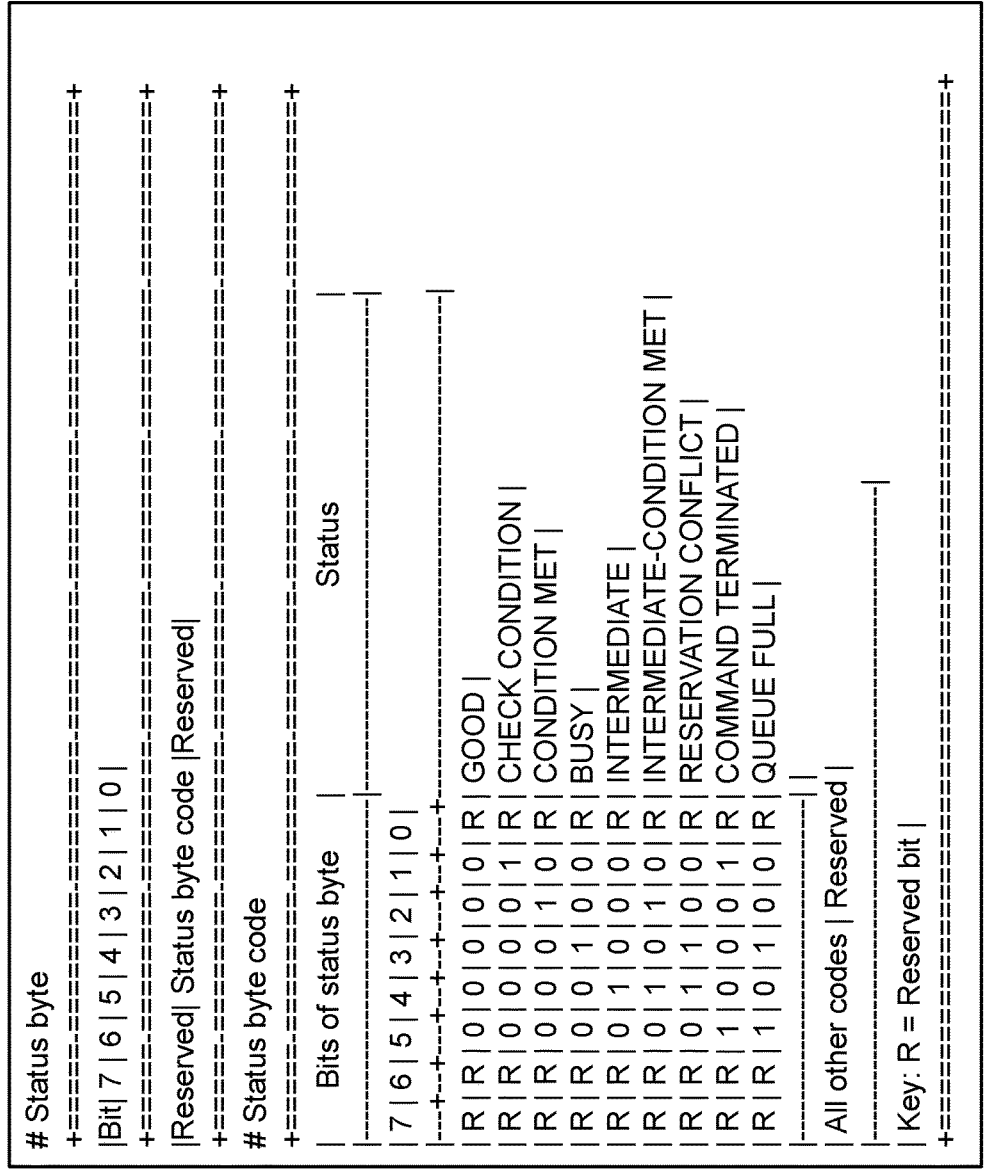
FIG. 4 shows an example format of a message sent from a storage array to a multi-path input-output (MPIO) driver of a host device indicating IO operation threshold status in an illustrative embodiment.

FIG. 4 shows an example format of a message 400 that may indicate a QFULL condition sent from a storage array 105 to one or more of the host devices 102. As noted herein, messages from a storage array 105 to one or more of the host devices 102 may be sent to the host devices 102 through the MPIO management station 116 or directly to the host devices 102. According to illustrative embodiments, the message 400 is received by an MPIO driver 112 of a host device 102. The path selection logic 114 selects paths over which IO operations are to be sent depending on the contents of the message 400. As can be seen in FIG. 4, the message comprises a plurality of bits 0, 1, 2, 3, 4, 5, 6 and 7. Bits 1 through 5 indicate statuses such as, for example, "Good," "Check Condition," "Condition Met," "Busy", "Intermediate," "Intermediate-Condition Met," "Reservation Conflict," "Command Terminated" and "Queue Full." Bits 0, 6 and 7 are reserved. Bits 6 and 7 are reserved for indicating the proactive QFULL condition when the IO count trend determination logic 122 determines that there is an upward trend in the number of outstanding IO operations and the short term EMA exceeds the threshold for the maximum number of outstanding IO operations per port for a given plurality of designated time intervals. The proactive QFULL condition differs from the "Queue Full" status provided by bits 1 through 5, which indicates a conventional queue full status (e.g., after IO operations have already exceed storage system or storage port limits and caused degradation of operations). According to illustrative embodiments, the proactive QFULL condition is provided as a control mechanism to avoid the conventional queue full status and degradation of operations.

In accordance with illustrative embodiments, the MPIO driver 112-1 determines whether one or both of bits 6 and 7 are set (e.g., activated) with a "1" indicator or cleared (e.g., not activated) with a "0" indicator. If bits 6 and 7 are cleared in a given message, the MPIO driver 112-1, and more particularly, the path selection logic 114-1 performs path selection according to its optimized mode for path selection. If bit 6 is set and bit 7 is cleared, the path selection logic 114-1 will retry IO operations on the same path as a previous path over which the IO operations were sent. If bit 7 is set and bit 6 is cleared, the path selection logic 114-1 will retry IO operations on a different path from a previous path over which the IO operations were sent in a round-robin manner. If both bits 6 and 7 are set indicating the QFULL condition, the path selection logic 114-1 will find a path corresponding to the least number of QFULL conditions and route IO operations over that path. For example, the path selection logic 114-1 maintains a record of the number of QFULL conditions received from the storage array 105 for respective ones of a plurality of ports and their corresponding paths and selects a path corresponding to a lowest QFULL condition count to be used for transmission of IO operations.

The storage array 105, through the IO count threshold adjustment logic 121 is illustratively configured to balance the availability of a storage array 105 with demand for IO operation processing from the host devices 102. For example, in some embodiments, the IO count threshold adjustment logic 121 is illustratively configured to set a first (e.g., low watermark) threshold for a maximum number of outstanding IO operations for the storage array 105. When in receipt of a plurality of IO operations from one or more of the host devices 102, the IO count threshold adjustment logic 121 increases the first threshold to at least one adjusted first threshold (e.g., a higher threshold) responsive to a number of the plurality of IO operations (e.g., host demand) exceeding the first threshold. In an illustrative embodiment, the first threshold is increased periodically to respective adjusted first thresholds at specified time intervals. The IO count threshold adjustment logic 121 increases the first threshold to respective higher thresholds by a pre-configured parameter. For example, the first threshold is increased by a particular number of IO operations each particular time interval (e.g., increased by 10 IO operations every 5 ms). If the number of the plurality of IO operations that are received by the storage array 105 (e.g., host demand) is less the first threshold, the IO count threshold adjustment logic 121 maintains the first threshold at its current level.

The IO count threshold adjustment logic 121 is further configured to set a second (e.g., high watermark) threshold for the maximum number of outstanding IO operations for the storage array 105, which is higher than the first threshold (e.g., low watermark). According to illustrative embodiments, in the process of increasing the first threshold, if an adjusted first threshold reaches or exceeds the second threshold (e.g., high watermark), the IO count threshold adjustment logic 121 stops the periodic increase of the first threshold.

In one or more embodiments, following increasing of the first threshold (e.g., low watermark), the IO count threshold adjustment logic 121 decreases a last adjusted first threshold to at least one reduced first threshold responsive to the number of the plurality of IO operations being less than the last adjusted first threshold. In other words, if host demand (e.g., number of received IO operations from the host devices 102) is less than the low watermark after the low watermark has been increased, the IO count threshold adjustment logic 121 decreases the low watermark until the low watermark is in a state of equilibrium with host demand (e.g., the number of received IO operations). Similar to the increasing of the first threshold, the decreasing of the first threshold may be performed periodically at specified time intervals (e.g., reduced by 10 IO operations every 5 ms). A state of equilibrium may be when the maximum number of outstanding IO operations represented by the low watermark is the same or substantially the same as the number of IO operations received by the storage array 105 from the host devices 102.

The storage array 105 is an example of what is more generally referred to herein as "at least one processing device" comprising a processor and a memory, with the processor being coupled to the memory. References herein to "at least one processing device" can additionally or alternatively include at least a portion of one or more of the host devices 102. Other types of arrangements of one or more processing devices can be used to implement functionality for IO count threshold adjustment and trend determination in a storage array 105 as disclosed herein. For example, the storage array 105 can illustratively include multiple sets of one or more processing devices, with each such set corresponding to a different distributed storage node. Each such additional processing device also includes a processor and a memory coupled to the processor, with the additional processing devices being implemented in the respective distributed storage nodes of the storage array 105 and configured to perform at least a portion of the IO count threshold adjustment and trend determination functionality.

An example of a process including operations of the type outlined above will be described below in conjunction with the flow diagram of FIG. 2. These and other operations referred to herein as being performed by one or more host devices operating in conjunction with one or more storage arrays of a storage system can in other embodiments involve additional or alternative system components, possibly including one or more external servers such as MPIO management station 116.

As noted above, the initiators of the initiator-target pairs illustratively comprise respective HBAs of the host device 102-1 and the targets of the initiator-target pairs comprise respective storage array ports of the storage array 105.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system in which multiple VMs run on a single ESXi server with HBAs. All VMs are using all HBAs but there is a need to be able to distinguish which IO belongs to which VM, for example, in order to implement different SLOs between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of VMs of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

These and other illustrative embodiments disclosed herein include functionality for IO count threshold adjustment and trend determination in a storage array 105 and corresponding path selection based on QFULL conditions provided to MPIO drivers 112 by the storage array 105. At least portions of that functionality are implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used.

As described above, in illustrative embodiments disclosed herein, the host devices 102 are configured to interact with storage array 105 to receive messages indicating QFULL conditions and execute path selection for IO operations to the storage array 105 based on the QFULL conditions.

Also, although the example algorithm described above illustratively utilizes MPIO drivers of respective host devices, other embodiments can be implemented outside of any multi-pathing software of the host devices. For example, other host device components can be used to execute path selection for IO operations to the storage array 105 based on the QFULL conditions, and to collaborate with the storage array 105 to determine information such as QFULL conditions.

It should also be noted that the example algorithm described above is not limited to use with particular types of IOs or IO command formats. For example, IOs comprising one or more commands of a standard storage access protocol, such as the above-noted SCSI and NVMe access protocols, can be utilized.

It is to be appreciated that the particular algorithm steps described above and elsewhere herein are presented by way of illustrative example only, and additional or alternative steps can be used in other embodiments. Also, the order of the steps can be varied, and/or at least some of the steps can be performed at least in part in parallel with one another. Other types of arrangements for IO count threshold adjustment and trend determination can be used in other embodiments.

Figure 2:
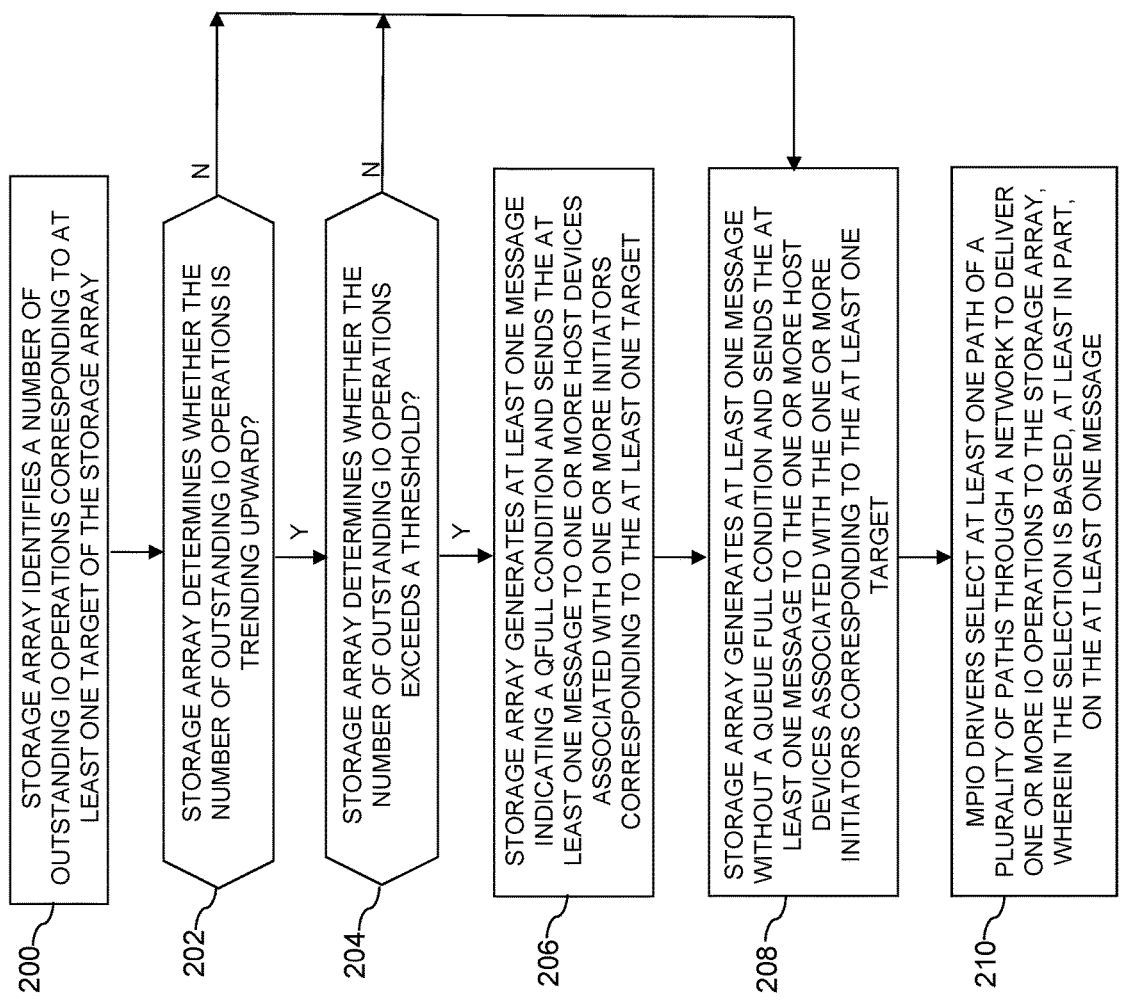
FIG. 2 is a flow diagram of an example process for IO count threshold adjustment and trend determination in a storage system in an illustrative embodiment.

Referring initially to FIG. 2, an example process for IO count threshold adjustment and trend determination is shown. The process as shown includes steps 200 through 210, and is suitable for use in the system 100 but is more generally applicable to other types of systems comprising at least one host device and a storage system. The storage system in this embodiment is assumed to comprise at least one storage array having a plurality of storage devices. The storage devices illustratively include logical storage devices such as LUNs or other logical storage volumes. The process includes storage-side portions comprising steps 200 and 208, and a host-side portion comprising step 210.

The storage-side portions of the FIG. 2 process are illustratively performed by a storage array such as storage array 105 of FIG. 1. Other arrangements of additional or alternative system components can be configured to perform at least portions of one or more of the steps of the FIG. 2 process in other embodiments.

The host-side portions of the FIG. 2 process are illustratively performed at least in part by or under the control of a multi-path layer comprising one or more MPIO drivers of respective host devices, such as host devices 102 of FIG. 1, cooperatively interacting with a storage array or other storage system, and possibly some participation by one or more additional components such as an external server comprising an MPIO management station, although use of an external server is not a requirement of this or other embodiments.

In step 200, a storage array identifies a number of outstanding IO operations corresponding to at least one target of the storage array.

In step 202, the storage array determines whether the number of outstanding IO operations is trending upward. In step 204, following an affirmative determination at step 202, the storage array determines whether the number of outstanding IO operations exceeds a threshold. The storage array determines whether the number of outstanding IO operations is trending upward over a plurality of designated time intervals by computing a plurality of EMAs of the number of outstanding IO operations. Respective EMAs of the plurality of EMAs correspond to different-sized windows of time. The storage array compares the respective EMAs to determine whether one or more of the EMAs is greater than and less than one or more other ones of the EMAs.

Following affirmative determinations at steps 202 and 204, in step 206, the storage array generates at least one message indicating a QFULL condition and sends the at least one message to one or more host devices associated with one or more initiators corresponding to the at least one target. The at least one message comprises one or more activated reserve bits indicating the QFULL condition.

In step 208, following a negative determination at step 202 and/or at step 204, the storage array determines a lack of a QFULL condition and generates at least one message without a queue full condition. The storage array sends the at least one message to the one or more host devices associated with the one or more initiators corresponding to the at least one target.

In step 210, based, at least in part, on the at least one message, MPIO drivers of the one or most host devices select at least one path of a plurality of paths through a network to deliver one or more IO operations to the storage array. In accordance with illustrative embodiments, the MPIO drivers determine whether one or two reserve bits are set (e.g., activated) with a "1" indicator or cleared (e.g., not activated) with a "0" indicator. If the two reserve bits are cleared in a given message (e.g., no QFULL condition), the MPIO drivers perform path selection according to their optimized modes for path selection. If one of the two reserve bits is set and the other of the two reserve bits is cleared (also not a QFULL condition), the MPIO drivers either retry IO operations on the same path as a previous path over which the IO operations were sent or retry IO operations on a different path from a previous path over which the IO operations were sent in a round-robin manner. If both of the two reserve bits are set indicating the QFULL condition, the MPIO drivers find a path corresponding to the least number of QFULL conditions and route IO operations over that path.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for IO count threshold adjustment and trend determination. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for IO count threshold adjustment and trend determination.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
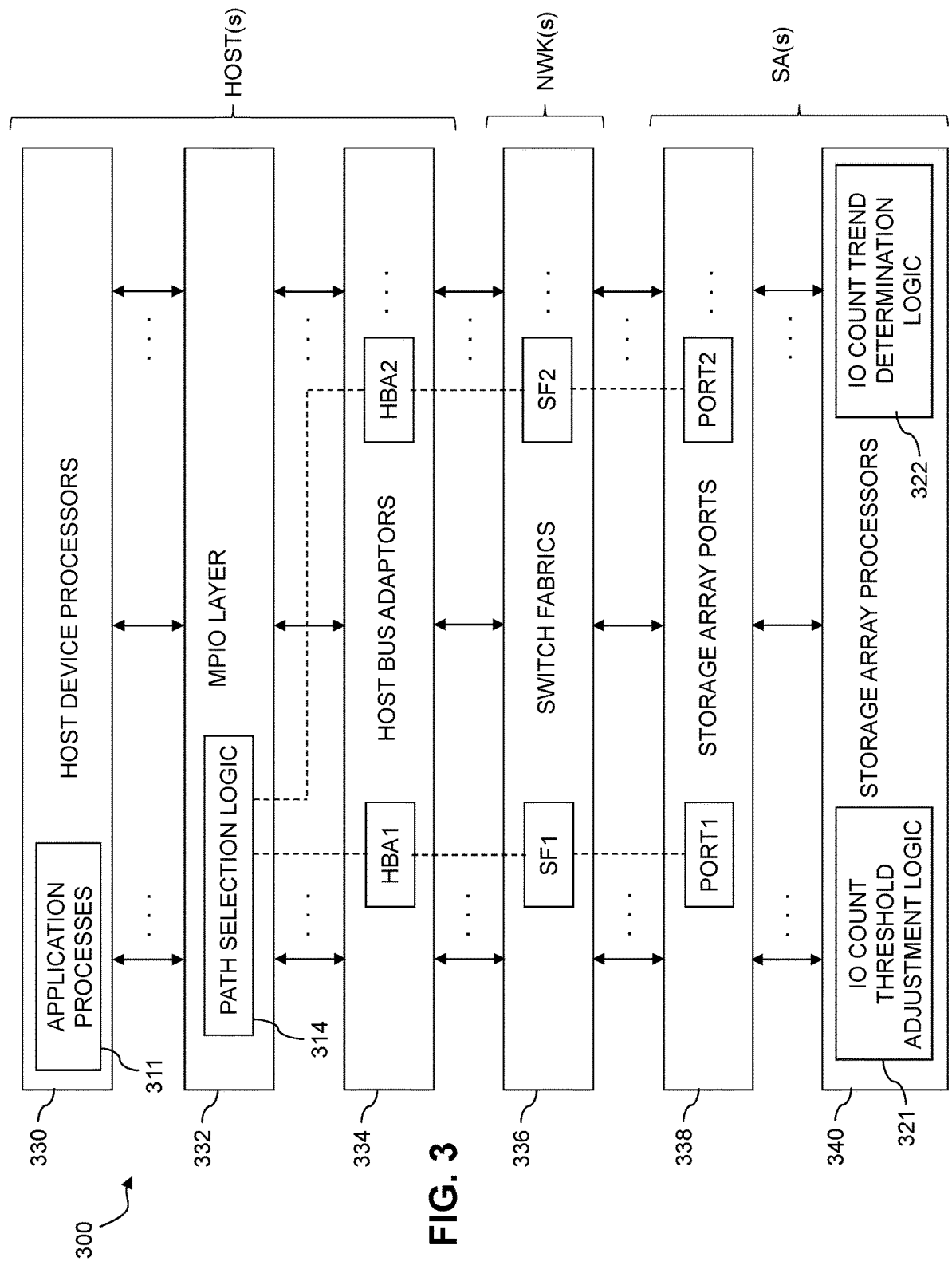
FIG. 3 is a block diagram showing multiple layers of a layered system architecture that incorporates functionality for IO count threshold adjustment and trend determination in a storage system in an illustrative embodiment.

Referring now to FIG. 3, another illustrative embodiment is shown. In this embodiment, an information processing system 300 comprises host-side elements that include application processes 311 and path selection logic 314. There are illustratively separate instances of one or more such host-side elements associated with each of a plurality of host devices of the system 300.

The system 300 further comprises storage-side elements that include IO count threshold adjustment logic 321 and IO count trend determination logic 322. There may be separate instances of one or more such storage-side elements associated with each of a plurality of storage arrays of the system 300.

The system 300 is configured in accordance with a layered system architecture that illustratively includes a host device processor layer 330, an MPIO layer 332, an HBA layer 334, a switch fabric layer 336, a storage array port layer 338 and a storage array processor layer 340. The host device processor layer 330, the MPIO layer 332 and the HBA layer 334 are associated with one or more host devices, the switch fabric layer 336 is associated with one or more SANs or other types of networks, and the storage array port layer 338 and storage array processor layer 340 are associated with one or more storage arrays ("SAs").

The host device processors of the host device processor layer 330 can comprise, for example, respective VMs and/or processor virtualization containers (e.g., Docker containers), or additional or alternative processing entities that generate IO operations for delivery to one or more storage arrays.

The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336. Paths are determined by the path selection logic 314 for sending such IO operations to the one or more storage arrays based, for example, on whether QFULL conditions have been received from the storage array processor layer 340.

The MPIO layer 332 is an example of what is also referred to herein as a multi-path layer, and comprises one or more MPIO drivers implemented in respective host devices. Each such MPIO driver illustratively comprises respective instances of path selection logic 314 configured as previously described. Additional or alternative layers and logic arrangements can be used in other embodiments.

In a manner similar to that described elsewhere herein, the MPIO layer 332 comprising path selection logic 314 illustratively processes a plurality of IO operations generated by a given host device. The IO operations are sent by the MPIO layer 332 to a storage array over respective paths selected using one or more algorithms implemented by path selection logic 314, which analyzes messages from the storage array processor layer 340 to determine whether IO count trend determination logic 321 has concluded the existence of a QFULL condition. In the system 300, path selection logic 314 is configured to select different paths for sending IO operations from a given host device to a storage array based. These paths as illustrated in the figure include a first path from a particular HBA denoted HBA1 through a particular switch fabric denoted SF1 to a particular storage array port denoted PORT1, and a second path from another particular HBA denoted HBA2 through another particular switch fabric denoted SF2 to another particular storage array port denoted PORT2.

These two particular paths are shown by way of illustrative example only, and in many practical implementations there will typically be a much larger number of paths between the one or more host devices and the one or more storage arrays, depending upon the specific system configuration and its deployed numbers of HBAs, switch fabrics and storage array ports. For example, each host device in the FIG. 3 embodiment can illustratively have a set of k paths to a shared storage array, or alternatively different ones of the host devices can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

In an example process for IO count threshold adjustment and trend determination, the IO count threshold adjustment logic 321 balances the availability of a storage array with demand for IO operation processing from the host device processor layer 330. For example, in some embodiments, the IO count threshold adjustment logic 321 is illustratively configured to increase or decrease a low watermark for a maximum number of outstanding IO operations for a storage array 105 responsive to a number of the plurality of IO operations (e.g., host demand). The IO count threshold adjustment logic 321 increases or decreases the low watermark until the low watermark is in a state of equilibrium with host demand (e.g., a number of received IO operations).

The IO count trend determination logic 322 determines whether a number of outstanding IO operations for a given port (e.g., PORT1 or PORT2) is trending upward and whether the number of outstanding IO operations exceeds a threshold for a maximum number of outstanding IO operations per port. The IO count trend determination logic 322 periodically monitors the number of outstanding IO operations per port at designated time intervals (e.g., every 5 ms) and computes a plurality of EMAs of the number of outstanding IO operations. Respective EMAs correspond to different-sized windows of time in order to respectively detect short, middle and long term trends of outstanding IO operation counts per port. In determining whether the number of outstanding IO operations is trending upward over a plurality of the designated time intervals, the IO count trend determination logic 322 compares the respective EMAs to determine whether one or more of the EMAs is greater than or less than one or more other ones of the EMAs.

When the IO count trend determination logic 322 determines that there is an upward trend in the number of outstanding IO operations and one of the EMAs exceeds the threshold for the maximum number of outstanding IO operations per port for a given plurality of designated time intervals, the storage array processor layer 340 generates at least one message indicating a QFULL condition. The message is sent to host device processor and MPIO layers 330 and 332. Responsive to a message indicating the QFULL condition, the path selection logic 314 will identify a path corresponding to the least number of QFULL conditions and route IO operations over that path.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of HBAs to accommodate predicted performance needs. In some cases, the number of HBAs per host device is on the order of 4, 8 or 16 HBAs, although other numbers of HBAs could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The HBAs of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for IO count threshold adjustment and trend determination can be performed using different system components.

For example, various aspects of functionality for IO count threshold adjustment and trend determination in some embodiments can be implemented at least in part using one or more servers that are external to a storage array 105 or other type of storage system. Also, processing logic can be implemented using other types of host drivers, such as, for example, SCSI drivers, NVMe drivers or more generally other host device components.

The particular arrangements described above for implementing IO count threshold adjustment and trend determination are therefore presented by way of illustrative example only. Numerous alternative arrangements of these and other features can be used in implementing IO count threshold adjustment and trend determination in other illustrative embodiments.

As indicated previously, the illustrative embodiments disclosed herein can provide a number of significant advantages relative to conventional arrangements.

For example, some embodiments are advantageously configured to provide storage arrays that dynamically control storage port IO operation thresholds and utilize EMA computations to determine upward or downward trends for the number of outstanding IO operations per port. The proactive threshold control and trend identification is used by the storage arrays to maintain balance of resources in a storage array and maintain equilibrium between host demand for processing of IO operations and the supply of storage system resources. By proactively communicating QFULL conditions to MPIO drivers, the storage arrays provide the MPIO drivers with needed information to select efficient paths for transmission of IO operations.

Illustrative embodiments advantageously avoid problems of conventional practice, by proactively identifying a QFULL condition before degradation of service such as, for example, decreased IOPS and increased latency, can occur, thereby resulting in improved overall performance.

These and other embodiments avoid the rejection of import administrative commands and unwanted reinstatement of paths which can be caused by the number of IO operations reaching a system limit. As a result, IO processing performance is improved, and the system can more easily meet performance goals.

In addition, some embodiments avoid the negative host performance implications of excessive signaling of queue full conditions to a random host device in a cluster when a system is already experiencing a shortage of resources.

Various aspects of functionality associated with IO count threshold adjustment and trend determination as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, initiators, targets, path selection logic, IO count threshold adjustment logic, IO count trend determination logic, and additional or alternative components. Also, the particular configurations of system and device elements and associated processing operations illustratively shown in the drawings can be varied in other embodiments. For example, a wide variety of different host device and storage system configurations and associated arrangements for IO count threshold adjustment and trend determination can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to identify a number of outstanding input-output (IO) operations corresponding to at least one target of a storage system, wherein the identifying is performed at designated time intervals;
to determine whether the number of outstanding IO operations is trending upward and exceeds a threshold over a plurality of the designated time intervals; and
to generate at least one message indicating a queue full condition responsive to an affirmative determination that the number of outstanding IO operations is trending upward and an affirmative determination that the number of outstanding IO operations exceeds the threshold, wherein the at least one message is sent to one or more host devices associated with one or more initiators corresponding to the at least one target of the storage system.

2. The apparatus of claim 1 wherein, in determining whether the number of outstanding IO operations is trending upward over a plurality of the designated time intervals, the at least one processing device is configured to compute a plurality of exponential moving averages of the number of outstanding IO operations, wherein respective exponential moving averages of the plurality of exponential moving averages correspond to different-sized windows of time.

3. The apparatus of claim 2 wherein, in determining whether the number of outstanding IO operations is trending upward over a plurality of the designated time intervals, the at least one processing device is further configured to compare the respective exponential moving averages to determine whether one or more of the exponential moving averages is one of greater than and less than one or more other ones of the exponential moving averages.

4. The apparatus of claim 1 wherein the at least one processing device is further configured to conclude a failure to meet a queue full condition responsive to a determination that the number of outstanding IO operations is trending downward.

5. The apparatus of claim 1 wherein the at least one processing device is further configured to conclude a failure to meet a queue full condition responsive to a determination that the number of outstanding IO operations is less than the threshold.

6. The apparatus of claim 1 wherein the at least one message comprises one or more activated reserve bits indicating the queue full condition.

7. The apparatus of claim 1 wherein the one or more host devices select at least one path of a plurality of paths through a network to deliver one or more IO operations to the storage system, wherein the selection is based, at least in part, on the at least one message.

8. The apparatus of claim 7 wherein respective ones of the plurality of paths correspond to respective ones of a plurality of queue full condition counts, and the at least one path corresponds to a lowest queue full condition count of the plurality of queue full condition counts.

9. The apparatus of claim 1 wherein the at least one processing device is further configured:
to set a first threshold for a maximum number of outstanding IO operations for the storage system;
to receive a plurality of IO operations from a plurality of host devices; and
to increase the first threshold to at least one adjusted first threshold responsive to a number of the plurality of IO operations exceeding the first threshold.

10. The apparatus of claim 9 wherein the at least one processing device is further configured to maintain the first threshold responsive to a number of the plurality of IO operations being less than the first threshold.

11. The apparatus of claim 9 wherein the at least one processing device is further configured to set a second threshold for the maximum number of outstanding IO operations for the storage system, wherein the second threshold is higher than the first threshold.

12. The apparatus of claim 11 wherein the first threshold is increased to respective adjusted first thresholds at specified time intervals, and wherein the at least one processing device is further configured to cease increasing the first threshold responsive to one of the adjusted first thresholds one of reaching and exceeding the second threshold.

13. The apparatus of claim 9 wherein the first threshold is increased to respective adjusted first thresholds at specified time intervals.

14. The apparatus of claim 13 wherein the at least one processing device is further configured to decrease a last adjusted first threshold to at least one reduced first threshold responsive to the number of the plurality of IO operations being less than the last adjusted first threshold.

15. The apparatus of claim 14 wherein the last adjusted first threshold is decreased until the at least one reduced first threshold is in a state of equilibrium with the number of the plurality of IO operations.

16. A computer program product comprising a non-transitory processor-readable storage medium having stored therein program code of one or more software programs, wherein the program code, when executed by at least one processing device comprising a processor coupled to a memory, causes the at least one processing device:
to identify a number of outstanding input-output (IO) operations corresponding to at least one target of a storage system, wherein the identifying is performed at designated time intervals;
to determine whether the number of outstanding IO operations is trending upward and exceeds a threshold over a plurality of the designated time intervals; and
to generate at least one message indicating a queue full condition responsive to an affirmative determination that the number of outstanding IO operations is trending upward and an affirmative determination that the number of outstanding IO operations exceeds the threshold, wherein the at least one message is sent to one or more host devices associated with one or more initiators corresponding to the at least one target of the storage system.

17. The computer program product of claim 16 wherein, in determining whether the number of outstanding IO operations is trending upward over a plurality of the designated time intervals, the program code causes the at least one processing device to compute a plurality of exponential moving averages of the number of outstanding IO operations, wherein respective exponential moving averages of the plurality of exponential moving averages correspond to different-sized windows of time.

18. The computer program product of claim 16 wherein the program code further causes the at least one processing device:
- to set a first threshold for a maximum number of outstanding IO operations for the storage system;
- to receive a plurality of IO operations from a plurality of host devices; and
- to increase the first threshold to at least one adjusted first threshold responsive to a number of the plurality of IO operations exceeding the first threshold.

19. A method comprising:
- identifying a number of outstanding input-output (IO) operations corresponding to at least one target of a storage system, wherein the identifying is performed at designated time intervals;
- determining whether the number of outstanding IO operations is trending upward and exceeds a threshold over a plurality of the designated time intervals; and
- generating at least one message indicating a queue full condition responsive to an affirmative determination that the number of outstanding IO operations is trending upward and an affirmative determination that the number of outstanding IO operations exceeds the threshold, wherein the at least one message is sent to one or more host devices associated with one or more initiators corresponding to the at least one target of the storage system;
- wherein the method is performed by at least one processing device comprising a processor coupled to a memory.

20. The method of claim 19 wherein determining whether the number of outstanding IO operations is trending upward over a plurality of the designated time intervals comprises computing a plurality of exponential moving averages of the number of outstanding IO operations, wherein respective exponential moving averages of the plurality of exponential moving averages correspond to different-sized windows of time.

\* \* \* \* \*